United States Patent [19]

Daniels

[11] Patent Number: 5,143,114

[45] Date of Patent: Sep. 1, 1992

[54] BALL VALVE LOCKOUT MECHANISM

[75] Inventor: Keith E. Daniels, Central, S.C.

[73] Assignee: GTE Valenite Corporation, Troy, Mich.

[21] Appl. No.: 659,820

[22] Filed: Feb. 25, 1991

[51] Int. Cl.⁵ .............................. F16K 27/08
[52] U.S. Cl. ........................... 137/385; 137/382; 70/180
[58] Field of Search .............. 137/385, 382, 383; 70/180

[56] References Cited

U.S. PATENT DOCUMENTS

| 961,959 | 6/1910 | Herfurth | 137/382 |
|---|---|---|---|
| 999,983 | 8/1911 | Gardner | 137/385 |
| 1,040,040 | 10/1912 | Shepard | 137/382 |
| 1,158,631 | 11/1915 | Caldwell | 137/385 |
| 1,293,095 | 2/1919 | Hill | 137/385 |
| 1,348,364 | 8/1920 | Koebel | 137/385 |
| 3,960,168 | 1/1976 | Plympton | 137/385 |

FOREIGN PATENT DOCUMENTS 205062 10/1926 Canada .................. 137/385

Primary Examiner—A. Michael Chambers

[57] ABSTRACT

A lockout mechanism for holding a ball valve in a closed condition for prolonged periods, e.g. while machinery that is supplied with pressurized fluid through the valve is being subjected to maintenance operations. The lockout mechanism indirectly provides a safety feature for the workman while he is working on the machinery.

6 Claims, 2 Drawing Sheets

BALL VALVE LOCKOUT MECHANISM

BACKGROUND OF THE INVENTION

1. Field of the Invention

This invention relates to industrial ball valves installed in pipe lines in manufacturing plants and commercial buildings.

2. Description of Prior Developments

Recent federal safety legislation requires a zero energy lockout condition when industrial machinery is being torn down or repaired. In the case of machinery that uses pressurized fluids the requirement will have to be satisfied by having valves that have a positive means for locking the valves in their closed positions while the associated machinery is under repair.

Many pressurized fluid systems use manually-operable ball valves for controlling the fluid flow. A typical ball valve has an operating handle extending right angularly from a rotary stem that projects from the ball valve housing; the stem serves as a connector between the ball element within the valve housing and the external handle. When the ball valve element is in the flow-open position the handle extends parallel to the flow passage in a plane coincident with the associated pipe line. To close the valve the handle is turned one quarter revolution so that the handle extends in a plane extending generally crosswise of the pipe line.

It would be possible to build lockout devices into ball valves to ensure that they remain in their closed positions while maintenance operations are being performed on the associated machinery, i.e. machinery that is normally supplied with pressurized fluids controlled by the ball valves. However, this would require replacement of existing ball valves, with the attendant expense related to the cost of the new valves, the labor cost of removing the old valves, and the labor cost of installing new valves. There would also be some expense due to the machinery being inoperative while the old valves were being removed and the new valves were being installed.

SUMMARY OF THE INVENTION

The present invention relates to a lockout mechanism that can be added to (or used with) existing ball valves to lock the valves in their off (closed) positions. The lockout mechanism is intended as a low cost way of meeting the aforementioned federal requirement for zero energy maintenance condition, as applied to machinery supplied with pressurized fluids controlled by ball valves.

In one form of the invention the lockout mechanism comprises a detachable bracket having a tubular element adapted for placement around the actuating handle of a ball valve, and a channel element adapted to partially encircle the pipe line in which the valve is installed. The bracket is retained in place on the ball valve by a padlock that has a U-shaped shackle adapted to extend through aligned openings in the channel flanges. The padlock and channel element cooperatively encircle the pipe line to retain the bracket in place on the ball valve. The bracket is designed for placement on the valve only when the valve handle is turned to the closed position; the tubular element encircles the handle to prevent it from being turned to the flow-open position. When the valve is in normal operation (open or closed) the bracket is removed from the valve; the valve is operated in its originally intended normal fashion.

THE DRAWINGS

DESCRIPTION OF PREFERRED EMBODIMENTS OF THE INVENTION

Figure 1:
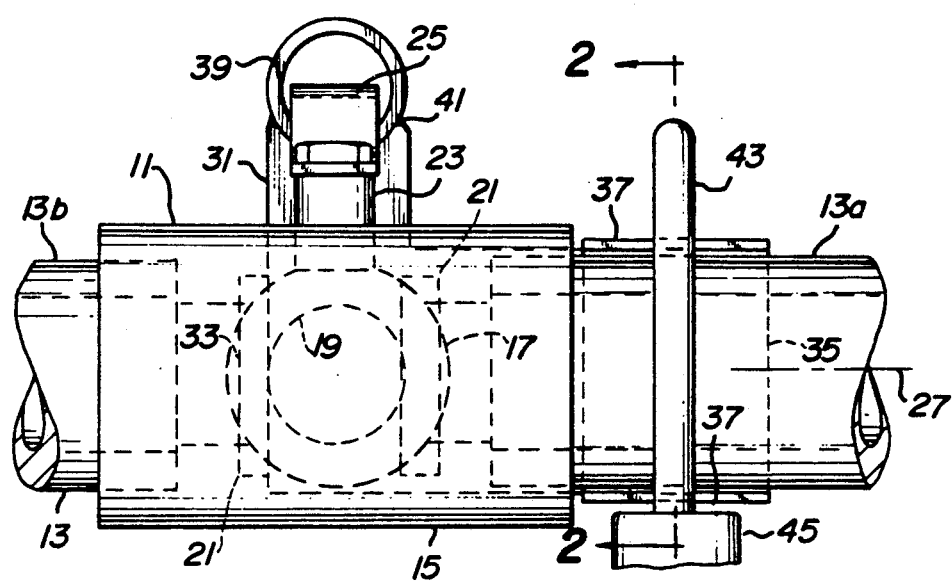
FIG. 1 is an elevational view of a ball valve installed in a pipeline, with a lockout mechanism of the present invention attached to the valve and to the line.
Figure 2:
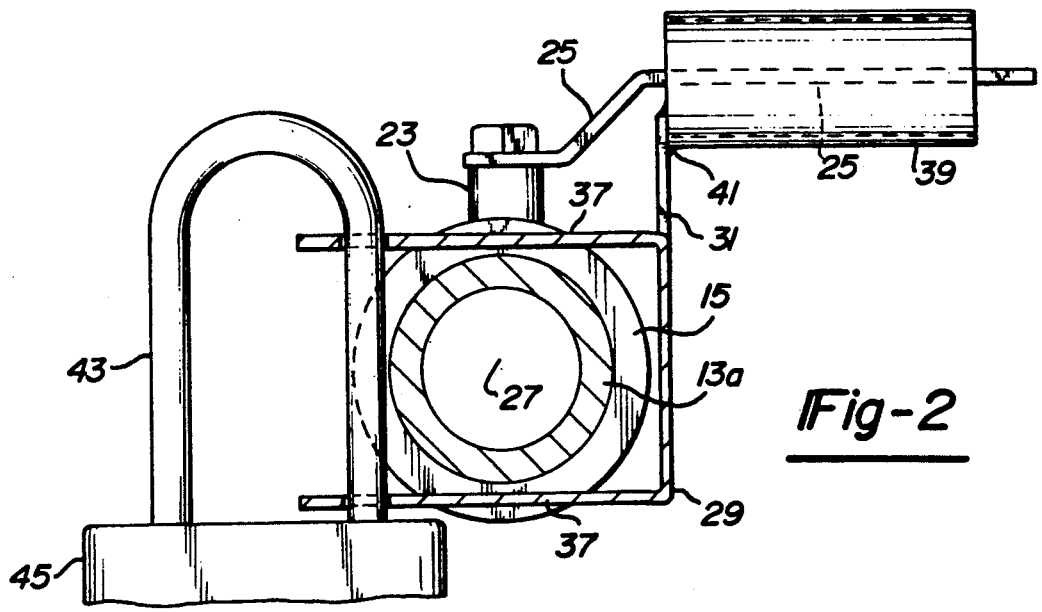
FIG. 2 is a transverse sectional view taken on line 2—2 in FIG. 1.

FIGS. 1 and 2 illustrate features of a conventional ball valve 11 installed in a pipeline 13. The pipeline comprises two aligned pipe sections 13a and 13b having screw-on connections with internally threaded cavities in opposite ends of the ball valve housing 15. Fluid flow through the valve is controlled by a ball valve element 17 having a circular hole 19 extending therethrough on a ball diameter. Surface areas of the ball are engaged with annular valve seats 21 located in the valve housing in alignment with the valve passage. FIG. 1 shows ball element 17 in its closed position, with hole (passage) 19 extending crosswise of the valve passage (normal to the plane of the paper).

A rotary stem 23 extends from ball element 17 through the housing wall to connect with a handle 25. The handle is usually formed out of flat bar steel (or heavy strap material). When ball element 17 is in its closed position handle 25 extends normal to the imaginary axis 27 of the pipeline, as shown in FIG. 2. The technician can thus detect a valve-closed condition by looking at handle 25. The ball valve element 17 is moved to the open position by turning handle 25 one quarter turn so that the handle is directly above pipeline axis 27.

The present invention is concerned more particularly with an add-on lockout mechanism for ensuring that the valve remains in a closed condition, e.g. while performing repair or maintenance operations on equipment that is supplied with pressurized fluid through the valve. The add-on mechanism comprises a two piece bracket 29. One of the bracket pieces comprises a flat connector plate 31 having a left end edge 33 and a right end edge 35 (in FIG. 1). The left portion of the connector plate is higher than the right portion, so that the plate has an L-shaped configuration a viewed in FIG. 1. Two flanges 37 extend right angularly from the rightmost portion of plate 31 to form a channel structure, as viewed in FIG. 2; the rightmost portion of plate 31 forms the web of the defined channel.

The other piece of the two piece bracket is a tubular element 39, welded to plate 31 by one or more weld connections 41. As viewed in FIG. 2, the tubular element 39 and channel extend in opposite directions from connector plate 31. Plate 31 serves a a connector in the sense that it acts as a connector between tubular element 39 and the channel element.

Bracket 29 is installed on the ball valve by slipping tubular element 39 onto (over) handle 25; the channel is spaced below the plane of tubular element 39 so that it slips onto pipeline section 13a. Channel flanges 37 have two aligned openings therethrough that can receive the U-shaped shackle 43 of a conventional padlock 45. The padlock acts as a retainer means for releasably holding the channel element on the pipeline. Bracket 29 is thereby positioned so that its tubular element 39 prevents significant rotary motion of the encircled handle 25, thereby achieving the desired valve lockout function. During normal operational periods bracket 29 is removed from the ball valve.

Figure 3:
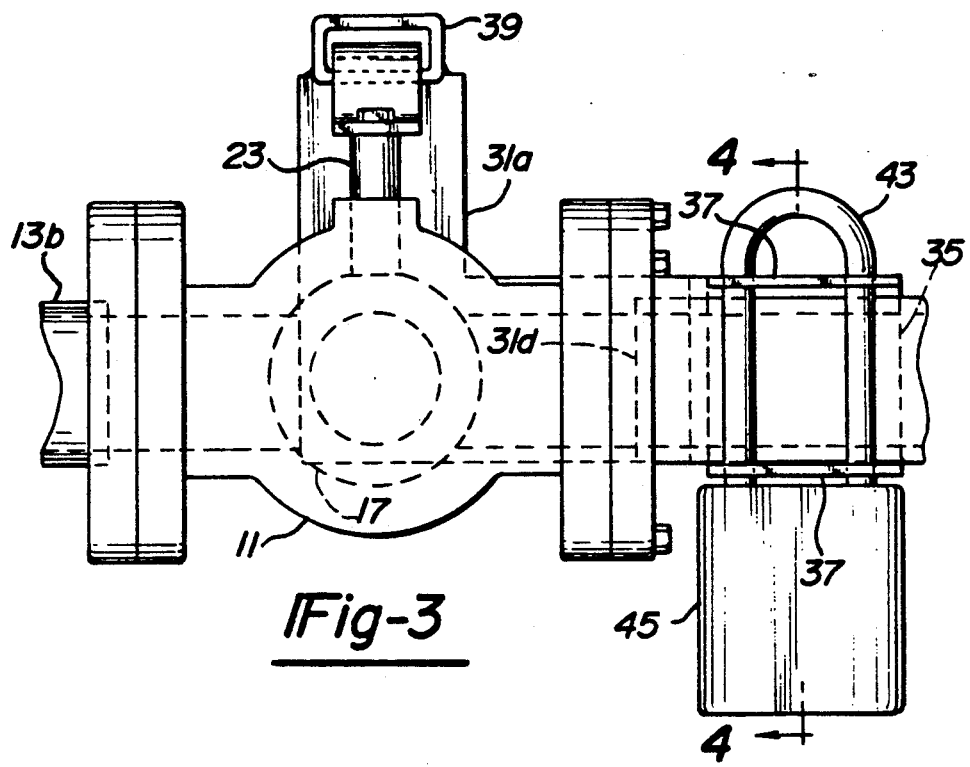
FIG. 3 is a view taken in the same direction as FIG. 1, but illustrating another embodiment of the invention.
Figure 4:
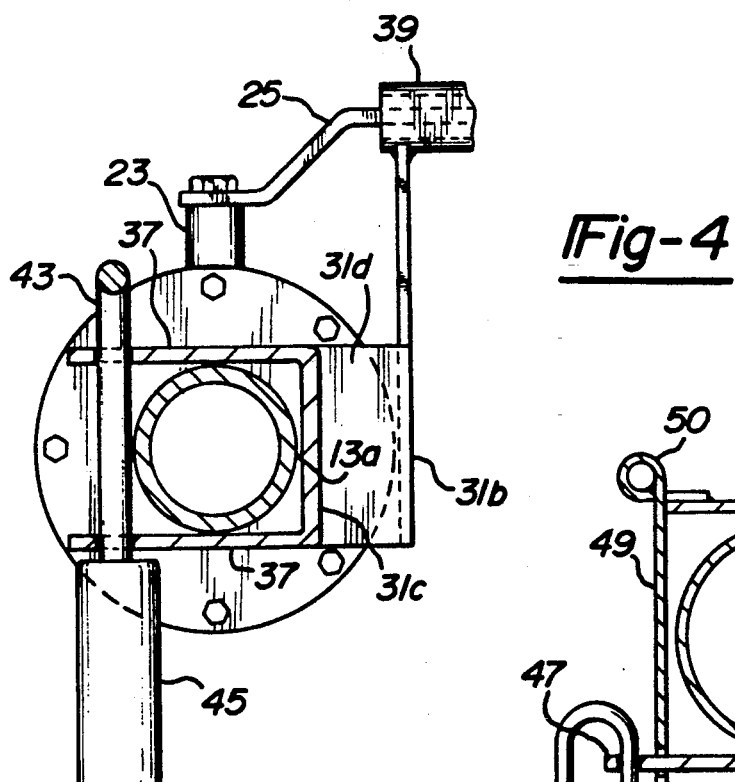
FIG. 4 is a transverse sectional view taken on line 4—4 in FIG. 3.

FIGS. 3 and 4 illustrate a slight variant of the invention that could prove useful with flanged ball valves. In this case the connector plate 31a has two offset parallel sections 31b and 31c joined together by a third section 31d. the offset allows the web of the channel (FIG. 4) to fit relatively close against the pipeline section 13a, while enabling the connector plate to clear the flanged area of the valve. Tubular element 39 can have a circular cross section, as shown in FIG. 1 or a rectangular cross section, as shown in FIG. 3. The tubular element could also have a hollow U-shaped (channel) cross section. Padlock 45 can be employed so that one leg of its shackle extends through aligned openings in the channel element flanges, as shown in FIG. 2; alternately the channel element flanges can have two sets of aligned openings so that each leg of the padlock shackle extends through two aligned openings, as shown in FIG. 3.

Figure 5:
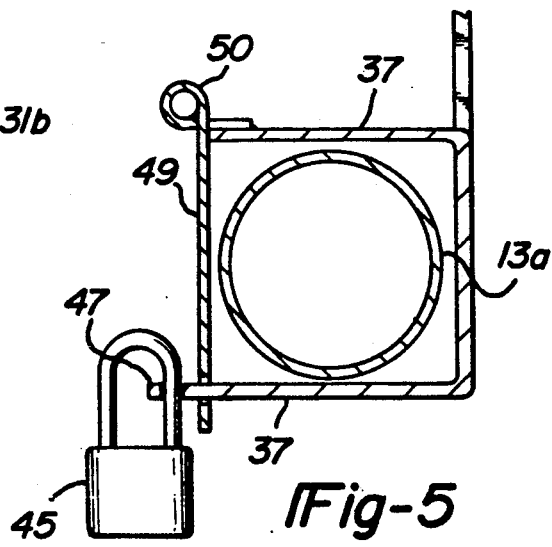
FIG. 5 is a sectional view taken in the same direction as FIGS. 2 and 4, but illustrating another version of the invention.

Bracket 29 will be constructed in various different sizes so as to fit different diameter pipelines. Ball valves are commonly manufactured in various different sizes, from a fraction of an inch pipe diameter up to about thirty six inch pipe diameter. In the case of larger size valves it may not be practical to use a padlock as the sole retaining means for holding bracket 29 on the pipeline; conventional padlocks may be too small. FIG. 5 shows an alternate retainer arrangement for use on large size pipelines. In this case the lowermost channel flange has a tab or prong 47 extending from its free edge. A hinged plate 49 is arranged to swing down so that a slot near the lower edge of the plate moves onto prong 47. A small padlock 45 can have its shackle extended through a circular hole in prong 47 to hold retainer plate 49 in position. Plate 49 will be swung up around its hinge 50 when it is desired to remove the bracket structure from the pipeline.

The chief advantage of each illustrated lockout mechanism is its relative low cost, and its ability to be used with conventional pre-existing ball valves already installed in pipelines. No alteration or reconstruction of the valve is required in order to provide the add-on lockout feature. The lockout mechanism is of general application in that it can be used on a variety of different commercial valve configurations offered by a range of different manufacturers.

What is claimed is:

1. A removable lockout mechanism for a manually-operated ball valve installed in a pipe line which must be entirely removed form the pipe line in order to operate the ball valve wherein the ball vale has a manual handle turnable around an axis that is normal to the axis of the pipe line in which the valve is installed; said removable lockout mechanism comprising a detachable bracket that includes a hollow element adapted for placement on the valve handle when the handle is turned to a closed position extending normal to the pipe line axis, and a channel element adapted to partially encircle the pipe lien; and retainer means for releasable holding the channel element on the pipe line, said bracket comprised of a connector plate means extending between said hollow element and said channel element; said hollow element extending in one direction relative to the connector plate means, and said channel element having its flanges extending in an opposite direction relative to the connector plate means.

2. The lockout mechanism of claim 1, wherein said retainer means comprises a padlock.

3. The lockout mechanism of claim 1, wherein said retainer means comprises aligned openings in the flanges of said channel element, and a padlock having a U-shaped shackle extending through said aligned openings.

4. The lockout mechanism of claim 1, wherein said bracket is formed of two pieces; one of said pieces being the hollow element, and the other piece constituting the connector plate means and the channel element.

5. The lockout mechanism of claim 4, wherein said hollow element has a weld connection to the connector plate means.

6. The lockout mechanism of claim 5, wherein said connector plate means has an L-shaped plan configuration.

* * * * *